United States Patent [19]
Park

[11] Patent Number: 5,864,656
[45] Date of Patent: Jan. 26, 1999

[54] SYSTEM FOR AUTOMATIC FAULT DETECTION AND RECOVERY IN A COMPUTER SYSTEM

[75] Inventor: Jee-Kyoung Park, Seoul, Rep. of Korea

[73] Assignee: SamSung Electronics Co., Ltd., Kyungki-do, Rep. of Korea

[21] Appl. No.: 885,995

[22] Filed: Jun. 30, 1997

[30] Foreign Application Priority Data

Jun. 28, 1996 [KR] Rep. of Korea .................. 1996 25237

[51] Int. Cl.$^6$ ............................. G06F 11/28; G06F 11/30
[52] U.S. Cl. ................................ 395/182.08; 395/182.21
[58] Field of Search ........................ 395/182.21, 185.08, 395/182.13, 182.08

[56] References Cited

U.S. PATENT DOCUMENTS

| | | | |
|---|---|---|---|
| 4,594,685 | 6/1986 | Owens | 395/182.21 |
| 4,627,060 | 12/1986 | Huang et al. | 395/183.12 |
| 4,689,766 | 8/1987 | Kent | 395/182.21 |
| 4,803,682 | 2/1989 | Hara et al. | 395/182.21 |
| 4,809,280 | 2/1989 | Shonaka | 395/185.08 |
| 4,811,200 | 3/1989 | Wagner et al. | 395/182.21 |
| 4,956,807 | 9/1990 | Hosaka et al. | 395/185.08 |
| 5,014,190 | 5/1991 | Johnson | 395/182.21 |
| 5,073,853 | 12/1991 | Johnson | 395/182.21 |
| 5,113,504 | 5/1992 | Matsuda | 395/182.21 |
| 5,333,285 | 7/1994 | Drerup | 395/182.21 |
| 5,390,324 | 2/1995 | Burckhartt et al. | 395/182.21 |
| 5,408,645 | 4/1995 | Ikeda et al. | 395/185.08 |
| 5,513,319 | 4/1996 | Finch et al. | 395/185.08 |
| 5,590,280 | 12/1996 | Watanabe | 395/185.08 |
| 5,596,711 | 1/1997 | Burckhartt et al. | 395/182.21 |
| 5,600,785 | 2/1997 | Potter | 395/182.21 |

*Primary Examiner*—Ly Hua
*Attorney, Agent, or Firm*—Robert E. Bushnell, Esq.

[57] ABSTRACT

A system for automatic fault detection and recovery in a computer system includes: a system fault detector, a halt time duration counter, and program and hardware recovery signal generators. The system fault detector is connected to a plurality of bus signal lines of a computer system to produce an output signal in response to an existence of an operating signal in the system bus. The halt time counter is operated in response to the output signal of the fault detector and clock signals to produce a set of count values each representing the passage of a predetermined time duration after a vanishing of the output signal of the fault detector. The program recovery signal generator produces a system management interrupt (SMI) signal when seven minutes have elapsed from the detection of the system halt. Also, the hardware recovery signal generator produces a reset signal when eight minutes have elapsed from the detection of the system halt. Further, the recovery system includes a selector consisting of a one-bit register for storing an initial value for enabling operation of the fault detector at the start of the computer system, the selector being connected to the system bus and changing its initial value in response to a BIOS program from the system bus to disable the operation of the fault detector. The computer system is set to save the data processed in an application program in response to the SMI signal.

11 Claims, 3 Drawing Sheets

SYSTEM FOR AUTOMATIC FAULT DETECTION AND RECOVERY IN A COMPUTER SYSTEM

CLAIM OF PRIORITY

This application makes reference to, incorporates the same herein, and claims all benefits accruing under 35 U.S.C. §119 from an application for SYSTEM FOR AUTOMATIC FAULT DETECTION AND RECOVERY IN A COMPUTER SYSTEM earlier filed in the Korean Industrial Property Office on the 28$^{th}$ day of Jun. 1996 and there duly assigned Serial No. 25237/1996, a copy of which application is annexed hereto.

BACKGROUND OF THE INVENTION

1. Field of the Invention

The present invention relates to a computer monitoring system, and more particularly to an automatic fault detection and recovery system for a computer.

2. Description of the Related Art

Recently, most of the computer systems adopt a low noise design that reduces operating noise occurring at the computer system itself as well as peripheral equipment for the purpose of improving the working environment. Thus, one can hardly hear the noise associated with the operation of the computer system during work. On the contrary, those computers adopting the low noise design result in difficulty of identification as to whether they are operating normally or have halted operation due to a failure until a task is finished.

In order to solve this problem, for example, there has been provided a monitoring apparatus with computer systems, for visibly displaying the normal operating state or halted state by using an LED device. The LED device is called a "heart-beat" unit and displays the operating status by its lighting mode. In such a monitoring system, a detector is associated with the system bus to detect the operating status of the computer system. If an operating signal, for example an address strobe signal is inputted into the detector, it outputs a signal to a first display driver that produces a periodic driving signal supplied to an LED. If no operating signal is found by the detector, the output signal is fed to a second display driver that produces a continuous LED driving signal. Thus, when LED is turned on and off for a preset time interval, i.e., blinks, users can recognize the normal operating state of the computer system. Also, the halted state of the computer system can be identified by the continuous lighting of the LED. If the system halt is recognized by the user, necessary measures can be taken to recover the computer system.

However, if they do not watch the LED carefully, the halted state of the computer system cannot be identified. In this regard, if the computer system is a remote computer connected by a local network and the system halt is occurring, there may be no remedy to recover the remote computer through a remote control. Further, if the computer system is a network server and operated in the night time without an operator, the system halt causes all works related to the server system to be stalled and may leave the system inoperative for a long time. In addition, if the user inadvertently resets or switches the power supply on or off during the halted state, a loss of processed data may occur in the computer system. Therefore, there was needed in the art a system that could protect against a halted state of the computer system and automatically recovers the system as soon as possible.

The following patents each disclose features in common with the present invention but do not teach or suggest the specifically recited automatic fault detection and recover system of a computer of the present invention: U.S. Pat. No. 5,596,711 to Burckhartt et al., entitled *Computer Failure Recovery And Alert System*, U.S. Pat. No. 5,600,785 Potter, entitled *Computer System With Error Handling Before Reset*, U.S. Pat. No. 5,596,711 Burckhartt et al., entitled *Computer Failure Recovery And Alert System*, U.S. Pat. No. 4,811,200 to Wagner et al., entitled *Multiple Microprocessor Watchdog System*, U.S. Pat. No. 5,333,285 to Drerup, entitled *System Crash Detect And Automatic Reset Mechanism For Processor Cards*, U.S. Pat. No. 4,594,685 to Owens, entitled *Watchdog Timer*, U.S. Pat. No. 4,803,682 to Hara et al., entitled *Resetting System*, U.S. Pat. No. 5,513,319 to Finch et al., entitled *Watchdog Timer For Computer System Reset*, U.S. Pat. No. 5,113,504 to Matsuda, entitled *Monitoring Apparatus For Control system With Microcomputer*, and U.S. Pat. No. 4,627,060 to Huang et al., entitled *Watchdog Timer*.

SUMMARY OF THE INVENTION

Accordingly, it is an object of the present invention to provide an automatic recovery system that can detect a system halted state and carry out a software recovery operation as well as a hardware recovery operation when a preset time has elapsed from the detection of a halted state.

According to the present invention, there is provided a system for automatic fault detection and recovery in a computer system, which comprises a system fault detector connected to a plurality of bus signal lines of a computer system for producing an output signal in response to an operating signal of the system bus; a halt time counter for counting clock signals in response to the output signal of the fault detector and clock signals to produce a set of count values each representing a passage of a predetermined time duration after the vanishing of the output signal of the fault detector; a program recovery signal generator for producing a first interrupt signal when the count values received from the halt time counter reach a preset first count value; a hardware recovery signal generator for producing a second interrupt signal when the count values received from the halt time counter reach a preset second count value, wherein the time duration corresponding to the second count value is longer than that of the first count value; and a selector for storing an initial value for enabling operation of the fault detector at the start of the computer system, the selector being connected to the system bus and the selection changing its initial value in response to a BIOS program from the system bus to disable the operation of the fault detector.

Preferably, the function selector includes a one-bit register, and the halt time counter includes a timer having a clear input for receiving the output signal of the fault detector, and four outputs for producing the set of count values. The halt time counter is designated to output one counter value for the number of clock signals corresponding to one minute. Further, the program recovery signal generator includes a NAND gate having a plurality of inputs each connected to the outputs of the halt time counter so that the gate produces a logical "0" output signal as the second interrupt signal. Also, the hardware recovery signal generator includes a NAND gate connected in parallel with the inputs of the NAND gate of the program recovery signal generator so that the second NAND gate produces a logical "0" output signal as the second interrupt signal.

According to the present invention, the first interrupt signal is a system management interrupt (SMI) signal, and the second interrupt signal is a system reset signal. The computer system employing the above arrangement performs the program recovery process in response to the first interrupt signal. Also, a hardware recovery process is performed in response to the second interrupt signal or reset signal.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Figure 1:
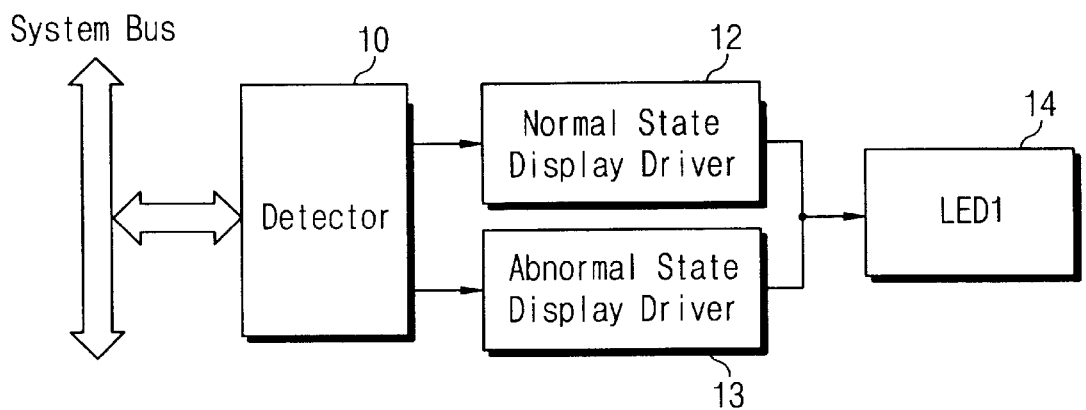
FIG. 1 is a block diagram of an earlier monitoring apparatus for detecting a system halt and for displaying the normal operating state or halted state in a computer system.

FIG. 1 is a block diagram of an earlier monitoring apparatus as discussed in the Background of the Invention. A detector 10 is associated with the system bus to detect the operating status of the computer system. If an operating signal is inputted into the detector 10, it outputs a signal to a first display driver 12 that produces a periodic driving signal supplied to an LED 14. If no operating signal is found by the detector 10, the output signal is fed to a second display driver 13 that produces a continuous LED driving signal.

Figure 2:
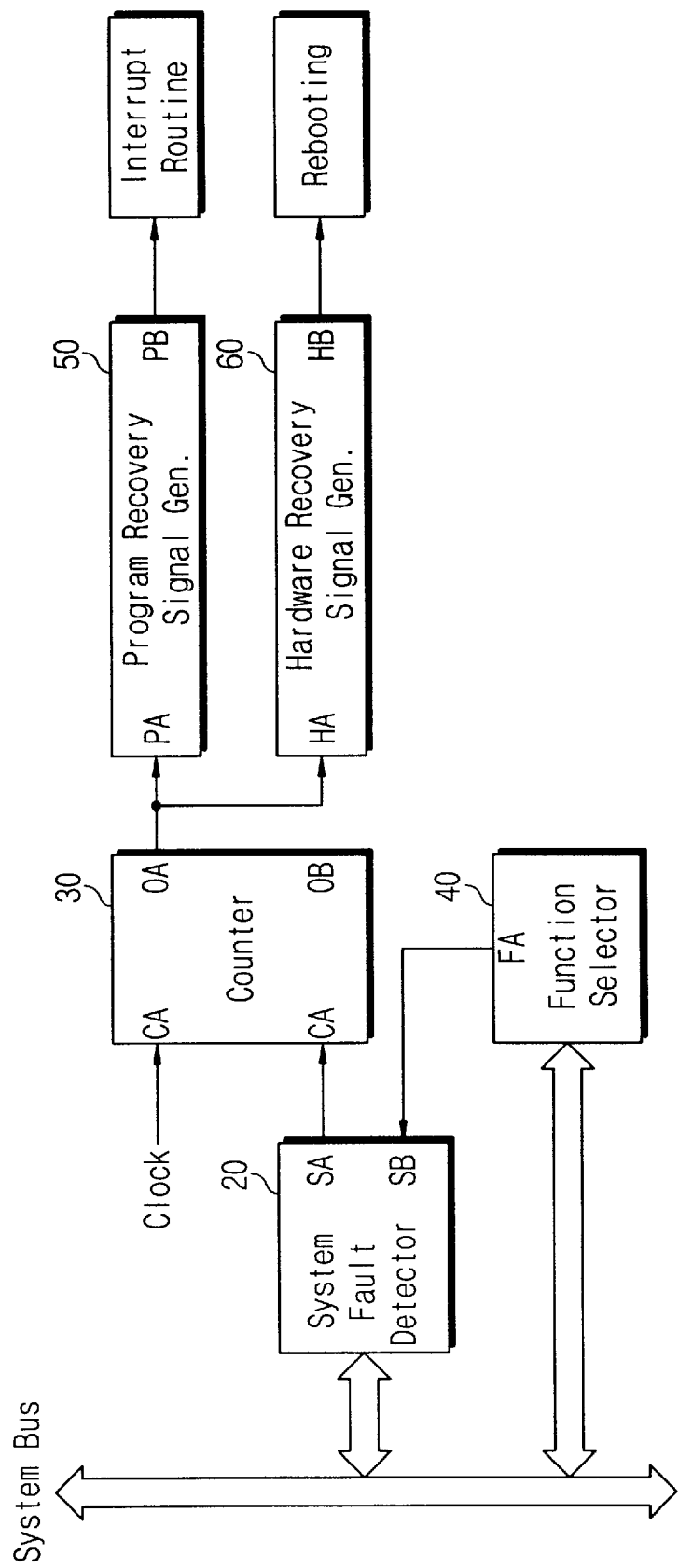
FIG. 2 is a block diagram of an automatic fault detection and recovery system according to the present invention.

Referring to FIG. 2, the automatic recovery system according to the present invention comprises a system fault detector 20, a halt time counter 30, a function selector 40, a program recovery signal generator 50, and a hardware recovery signal generator 60. The system fault detector 20 and the function selector 40 are connected to a system bus of a computer system. The system bus also includes a PCI bus, an EISA bus, and an ISA bus. The output of the function selector 40 is fed to one input of the system fault detector 20.

The halt time counter 30 has a clock signal input CA and a clear signal input CB connected to the output of the system fault detector 20. The output of the halt time counter 30 is connected to inputs of the program recovery signal generator 50 and hardware recovery signal generator 60.

The function selector 40 is initially set to the enabled state and this will initiate the above recovery system at its starting. That is, the function selector 40 stores its enable state (default value "0") and if users write "1" through the system BIOS program, the function selector 40 will be disabled and the recovery system of FIG. 2 will not operate.

When the computer system is turned on, the enable signal stored in the function selector 40 is supplied to the system fault detector 20. This will also enable the fault detector 20 to detect the operating state of the system bus.

If at least one operating signal, for example, an "address strobe" signal from the host (CPU) bus has detected, the system fault detector 20 produces an output signal at the terminal SA.

The output signal representing the operation of the system is supplied to the halt time counter 30. Upon receiving the signal, the counter 30 is cleared and reset to its initial value. This will allow the program recovery signal generator 50 and hardware recovery signal generator 60 to be in their inactive state. On the other hand, if no operating signal is detected in the fault detector 20 for a preset time interval, the counter 30 generates a carry at its output and produces counting value corresponding to the carries. That is, the counter 30 counts input clock signals for a preset time interval and produces a halt time signal representing the predetermined counter value. The halt time signal output of the counter 30 is supplied to both inputs PA and HA of the program recovery signal generator 50 and hardware recovery signal generator 60.

The program recovery signal generator 50 outputs a first interrupt signal when the halt time signal from the counter 30 reaches a preset first count value. Also, the hardware recovery signal generator 60 outputs a second interrupt signal when the halt time signal reaches a preset second count value. In response to the first interrupt signal, the computer system performs a software recovery process. Responsive to the second interrupt signal, a hardware recovery process is performed.

Figure 3:
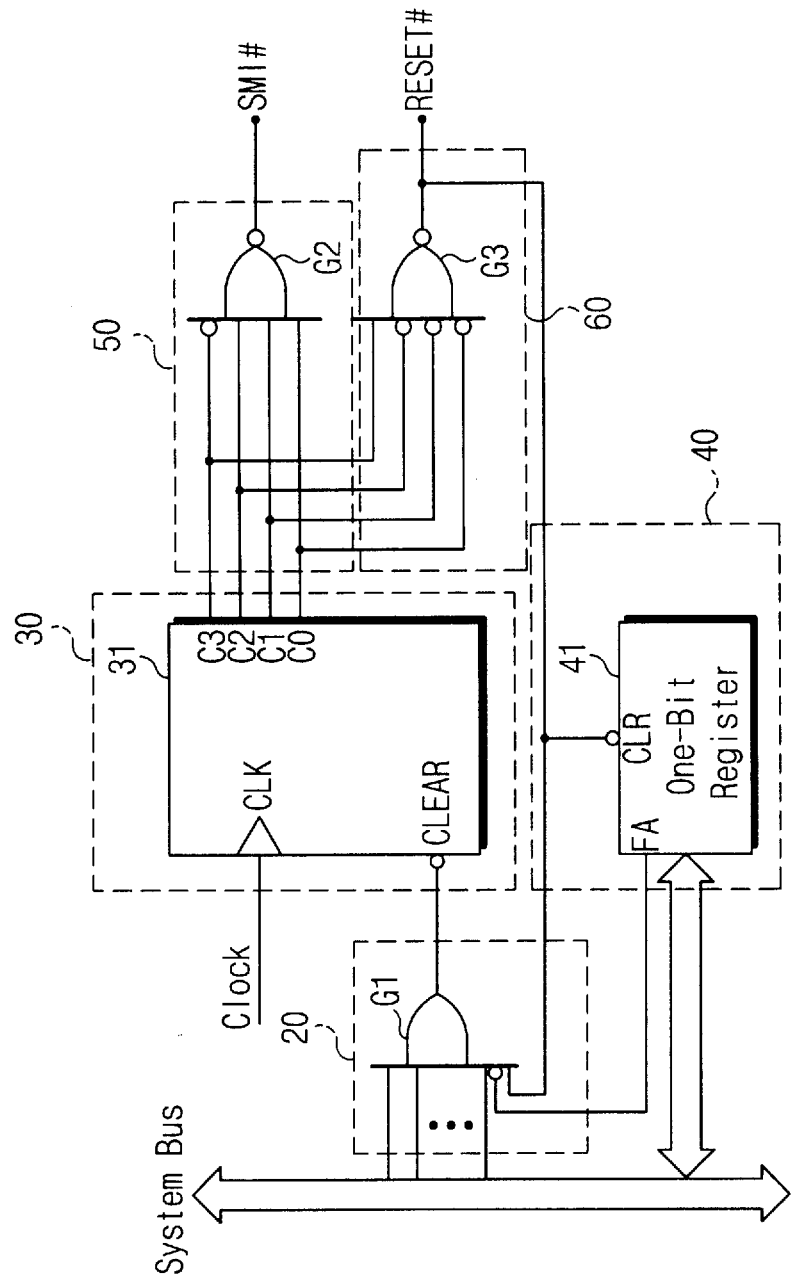
FIG. 3 is a schematic circuit diagram of the fault detection and recovery system according to the present invention.

FIG. 3 illustrates a detailed diagram of the recovery system shown in FIG. 2. The system fault detector 20 consists of an AND gate G1. The inputs of gate G1 are connected to signal lines of the system bus. The function selector 40 preferably consists of a one-bit register 41, and its output FA is connected with one input of the AND gate G1 via an inverter. The one-bit register 41 is designated by an address signal supplied through the system bus. Initially, the register 41 stores one bit of a logical "0" state which enables the recovery system to operate, and changes to "1" state when the recovery system is to be disabled.

As to the halt time counter 30, it consists of a counter or timer 31. The clock input CLK receives a system clock signal, and the clear input CLEAR is connected to the output of the AND gate G1 through an inverter. The outputs C0, C1, C2, and C3 of the timer 31 are provided to supply counter output values to the program recovery signal generator 50 and hardware recovery signal generator 60, which consists of NAND gates G2 and G3. In detail, the outputs C0, C1, C2 of the timer 31 are connected to the inputs of the NAND gate G2 and to the inputs of the NAND gate G3 via inverters, respectively. Also, the output C3 of the timer 31 is connected via an inverter to one input of the NAND gate G2 and to one input of the NAND gate G3.

In operation, every time the timer 31 is cleared by the output signal of the AND gate G1 representative of the state of the system bus, the output values of the timer 31 are initialized and the NAND gates G2 and G3 maintain their inactive state. However, at the time that no signal is inputted from the system bus, the timer 31 starts to count the input clock signal and outputs a counter value at the terminals C0–C3. For example, if the timer 31 is designate to output one counter value for the number of clock signals corresponding to one minute, a logical value "1" appears at the output C0 when one minute has elapsed. Also, a "1" appears at the output C1 for two minutes and at the outputs C0 and C1 for three minutes. Further, a "1" appears at the output C2 for four minutes, and at the outputs C0 and C2 for five minutes, and at the outputs C1 and C2 for six minutes, and at the outputs C0, C1, and C2 for seven minutes, and at the output C3 for eight minutes.

In this regard, when the value "1" is output from C0, C1, and C2 and a "0" is output from C3, the NAND gate G2 receiving those signals outputs a value "0". This logical "0" output signal is regarded as a program recovery signal or System Management Interrupt (SMI) signal. Thus, the recovery system of FIG. 3 is designated to produce the program recovery signal when seven minutes have elapsed from the detection of a system halt.

Further, when the value "1" is output from C3, and a "0" is output from C0, C1, and C2, the NAND gate G3 outputs a value "0." This logical "0" output signal is regarded as a hardware recovery signal or reset signal. In other words, the recovery system of FIG. 3 is designated to produce a hardware reset signal when eight minutes have elapsed from the detection of the system halt.

The above SMI signal SMI# and reset signal RESET# are supplied to the CPU of the computer system. Generally, the SMI is given the most priority among all interrupts in the computer system and is assigned for managing the computer system.

Upon receiving the SMI signals, the CPU responds to issue an acknowledge signal. Then, it enters an SMI routine or software recovery process that allows, for example, the data stored in the main memory to write into the hard disk drive (i.e. a save operation) and terminates an application program.

Meanwhile, if an operation of any system bus associated with the AND gate G1 is found in the software recovery process, the recovery system of FIG. 3 is initialized as previously mentioned. However, unless the operation of a system bus can be found even when one minute has elapsed after the SMI signal has occurred, i.e., when eight minutes have passed, the reset signal RESET# is generated at the output of the NAND gate G3. Thus, rebooting of the computer system is performed.

As is apparent from the above description, the recovery system of the present invention is capable of monitoring abnormal program execution including an endless loop, without depending on a specific monitoring program. The further advantages are: automatic saving of data is possible before resetting of the computer system when the system halt is detected for a preset period. Thus, the loss of data is effectively prevented. Secondly, automatic rebooting is possible when the system halt is continued, thereby insuring the recovery of the computer system without being attended to by an operator. Finally, the recovery system can be set to the enabled/disabled condition by a programable BIOS program.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A system for automatic fault detection and recovery in a computer system comprising:
    a system fault detector connected to a plurality of bus signal lines of a computer system for producing an output signal in response to an operating signal from the system bus;
    a halt time counter for counting clock signals in response to the output signal of the fault detector to produce a set of count values, each representing a passage of a predetermined time duration after a vanishing of the output signal of the fault detector;
    a program recovery signal generator for producing a first interrupt signal when the count values received from the halt time counter reach a preset first count value, the first interrupt signal being inputted to the computer system to effect a program recovery process;
    a hardware recovery signal generator for producing a second interrupt signal when the count values received from the halt time counter reach a preset second count value, the time duration corresponding to the second count value being longer than that of the first count value, the second interrupt signal being inputted to the computer system to effect a hardware recovery process; and
    a selector, connected to the system fault detector for storing an initial value for enabling operation of the fault detector at the start of the computer system, the selector being connected to the system bus and the selector changing its initial value in response to a BIOS program from the system bus to disable the operation of the fault detector.

2. The system according to claim 1, the selector comprising a one-bit register.

3. The system according to claim 1, the system fault detector comprising an AND gate having a plurality of inputs connected to a plurality of bus lines and an inverter input connected to the output of the selector.

4. The system according to claim 1, the halt time counter comprising a timer having a clear input for receiving the output signal of the fault detector, and four outputs for producing the set of count values.

5. The system according to claim 4, the halt time counter outputting one counter value for a number of clock signals corresponding to one minute.

6. The system according to claim 1, the halt time counter outputting one counter value for a number of clock signals corresponding to one minute.

7. The system according to claim 1, the program recovery signal generator comprising a first NAND gate having a plurality of inputs each connected to the outputs of the halt time counter so that the gate produces a logical "0" output signal as the first interrupt signal.

8. The system according to claim 7, the hardware recovery signal generator comprising a second NAND gate having inputs respectively connected in parallel with the inputs of the first NAND gate so that the second NAND gate produces a logical "0" output signal as the second interrupt signal.

9. The system according to claim 1, the first interrupt signal comprising a system management interrupt (SMI) signal for causing the computer system to save the data processed in an application program.

10. The system according to claim 1, the second interrupt signal comprising a system reset signal for causing a rebooting of the computer system.

11. A system for automatic fault detection and recovery in a computer system comprising:
    a system default detector connected to a plurality of bus signal lines of a computer system for producing an output signal in response to an operating signal from the system bus;
    a halt time counter for counting clock signals in response to the output signal of the fault detector to produce a set of count values, each representing a passage of a predetermined time duration after a vanishing of the output signal of the fault detector;
    a program recovery signal generator for producing a first interrupt signal when the count values received from the halt time counter reach a preset first count value, the first interrupt signal being inputted to the computer system to effect a program recovery process; and
    a hardware recovery signal generator for producing a second interrupt signal when the count values received from the halt time counter reach a preset second count value, the time duration corresponding to the second count value being longer than that of the first count value, the second interrupt signal being inputted to the computer system to effect a hardware recovery process.

* * * * *